July 4, 1944.  W. O. FROHRING  2,352,621
VOLTAGE CONTROL MEANS
Filed Oct. 6, 1941
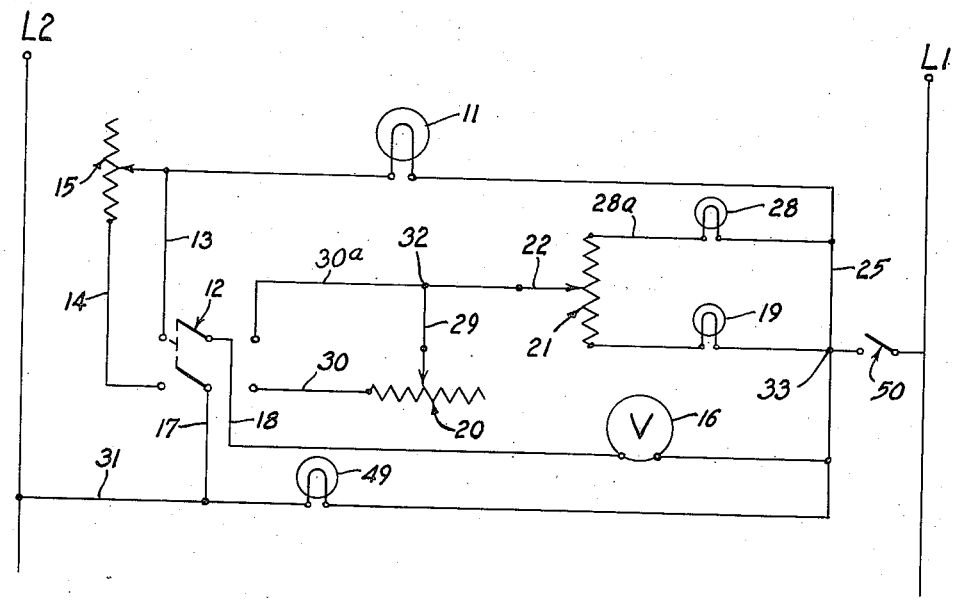
INVENTOR.
WILLIAM O. FROHRING
BY Hyde and Meyer
ATTORNEYS Patented July 4, 1944

2,352,621

UNITED STATES PATENT OFFICE 2,352,621

VOLTAGE CONTROL MEANS

William O. Frohring, Cleveland Heights, Ohio

Application October 6, 1941, Serial No. 413,765

2 Claims. (Cl. 315—296)

The invention relates to an improvement in electrical controlling or recording devices and more particularly to an improvement in a clinical diagnostic instrument of the character disclosed and claimed in United States Patent No. 2,234,240 to Frohring et al., to which reference may be had if desired.

The said patent relates to a scientific instrument and to a method of examining the human eye to determine the rate at which visual purple is depleted in the retina of the eye under test, as compared with that of a normal individual, by a source of light which is bright enough to deplete visual purple at a rate faster than it is regenerated.

It is generally acknowledged that the ability of the eye to adapt itself to changes in light intensity is materially affected by certain factors, among which is the quantitative occurrence of vitamin A in the system. The correlation between night blindness and vitamin A deficiency has been the subject of considerable discussion in the medical profession and is practically universally recognized. This night blindness disappears promptly when a normal quantity of vitamin A is restored to the system.

The clinical diagnostic instrument mentioned above, and commercially available under the registered trade name of "Bio-Photometer" is an apparatus for determining the ability of the eye to regenerate visual purple (that is to say, to approach and attain normal vision) after being exposed to a light of predetermined intensity for a standard time period. Briefly, the test involves subjecting the patient to a preliminary dark adaptation period of ten minutes in total darkness, to eliminate variables which might result from previous lighting conditions, followed by a "bleaching" period of, for example, three minutes under a light intense enough to overcome the normal regenerative capacity of the visual purple reproductive faculty, after which the recovery factor of the eye is determined by a succession of tests at spaced, short intervals, with a test light of controllable intensity, these tests furnishing a measure of the comparative ability of various eyes to achieve the threshold of visibility as the bleaching effect wears off. A chart is usually made up for each individual in which the successive test intervals are plotted against the light intensities which are just perceptible at the end of each cumulative interval. The curve thus secured is compared with a standard curve, representing normal vision, and, as previously mentioned, inability to achieve normal speed of visual purple regeneration quite universally accompanies a deficiency in vitamin A.

The test just described is a sensitive one and obviously its accuracy and reliability depend on the precise reproduction, day after day, of any desired light intensity within the testing range. The dial pointer, or other indicating means, is usually operatively associated with some adjustable means of introducing resistance in the test lamp power circuit, so that when the operator sets the indicator for a desired light intensity, this operation introduces into the said circuit a precalculated fraction of the total available resistance units. Since the line voltage available in the usual population centers fluctuates within a certain range depending on periodic changes in demand throughout the day, an additional precaution was observed in the design of the diagnostic instrument above mentioned involving the provision of an additional line rheostat which was used, in conjunction with a voltmeter, to bring the line voltage supplied to the instrument to a uniform starting point, which we may term the calibration point, after which the adjustable resistance was cut into the circuit to vary the intensity of the test lamp as desired.

As will later appear this construction yields practically uniform duplication of light intensity results from day to day although there is a possibility of an error of small dimensions arising from a variation in the resistance load of the adjustable resistance for different light intensities in conjunction with the variable resistance load on the line rheostat by reason of variation of line voltage, as aforesaid.

The general object of the present invention, therefore, is the provision of a simple and inexpensive means for balancing the variable load on the line rheostat arising from variations in setting of the adjustable resistance, whereby reproducibly consistent light values are obtainable despite fluctuations in the power supply.

Another object of the invention is the provision of a device of this nature which may be substituted for the more complicated and expensive voltage regulators in adaptations generally similar to that here described.

Further objects and advantages will be apparent as the description proceeds.

The invention will be more readily understood by reference to the accompanying drawing, in which the single view is an "across-the-line" diagram illustrating the incorporation of my resistance balancing device in the complete circuit.

The various structural units shown diagrammatically in the drawing are housed in a suitable casing provided with perforations so as to permit manipulation of the adjustable elements of the mechanism through suitable shafting or other necessary linkage. A detailed showing of the apparatus is not here made, but, if desired, reference may be had to such showing in the aforesaid United States Patent No. 2,234,240. It is sufficient to say that the device is provided with an extension portion adapted to fit around the eyes of the patient, permitting him to gaze therethrough towards the interior of the casing. A bright lamp, or bleaching lamp is contained within the casing, and also another lamp of more moderate intensity for use as a test light to determine the recovery curve of the eyes being tested. In the usual operation of the device the test light illuminates certain areas of a target, some of these areas being illuminated to a greater extent than others, thereby furnishing additional variants in light intensities of which the patient may become successively aware as his vision improves, or as the test light is increased in brightness. For simplicity, however, the operation will be discussed as if the test light itself appears or disappears as its energization source is varied, or as the patient's visual ability changes.

Means are provided, including switches, shutters, etc., for first permitting the patient's eyes to remain in complete darkness for a predetermined period of time, preferably for five to ten minutes or longer, although in this period intermittent tests may be made with the test light to obtain preliminary determinations of the eye condition. The general purpose of the period, however, is to eliminate the disturbing effect, on the subsequent test, of possible wide variations in light condition to which patients may have been exposed immediately prior to the test.

Referring to the drawing, reference numeral 11 indicates a bleaching lamp which is energized from a suitable power source, $L_1$—$L_2$, when the double throw, double pole switch 12 is moved to the left-hand position and makes connection between wires 17, 18 and conductors 13 and 14. In series with lamp 11 is a variable line rheostat 15 and shunted across the lamp leads is a voltmeter 16. Since a constant light intensity is desired for the bleaching exposure, the line rheostat 15 is manipulated by the operator to control the voltage at a desired point, say 100 volts, which may be termed the calibration voltage.

After exposure of the subject's eyes to the bleaching light for a set time, as aforesaid, the switch 12 is thrown to its right-hand position where it makes connection between wires 17, 18 and conductors 30 and 30a, thereby cutting bleaching lamp 11 out of circuit, and energizing test lamp 19. Lamp 19 is in series with a line voltage control rheostat 20 and also with an adjustable resistance 21. The voltmeter 16 is now shunted across lamp 19 and resistance 21.

The indicating pointer 22 of resistance 21 is associated with a graduated dial (not shown), numbered for any convenient arbitrary scale system. With the instrument provided only with the circuit and parts so far described, it is obvious that if the line voltage available at $L_1$—$L_2$ were of unvarying value, the rheostat 20 could be dispensed with, and the dial associated with resistance 21 would indicate, from the position of pointer 22, successively reproducible constant units of electrical energy supplied to test lamp 19, and consequently, for example, a dial reading of 60 at pointer 22 in any test would correspond to the exact light intensity for which that point was originally calibrated. Likewise said light intensity would also correspond to the intensity achieved in prior and subsequent tests at the same dial setting. Unfortunately an absolutely constant line voltage is not available under actual operating conditions, and therefore, with the circuit so far described, the accuracy of the setting, within limits, is affected by variations in line voltage; that is also true even when the test is started by setting the voltmeter 16 at calibration value by use of an adjustable rheostat 20.

Stating the situation first in nonmathematical terms, if at two successive test periods the line voltage in the first test period must be reduced from 120 volts to 105 volts by rheostat 20, and in the second period from 110 volts to 105 volts, thereby requiring the introduction of a different number of units of resistance for the several tests, and thereafter the dial pointer of resistance 21 is set at a designation of 60 for both tests, it is obvious that the light intensity of test light 19 will vary from one test to the other by reason of the variation in total circuit resistance load which is required to both correct for the line voltage variation and to achieve the desired apparent light intensity. There is accordingly a small but perceptible percentage change in the resistance characteristics of the resistance 21 dependent upon correction of the resistance 20 for line voltage fluctuations, this change being determinable, as to its magnitude in particular cases, only in connection with the resistance-current characteristics of the test lamp. The error of course varies ratably with various settings of the resistance 21 since the resistance load on rheostat 20 is thereby varied.

The mathematical verification of the error introduced by line voltage fluctuation in the circuit so far described may be developed as follows:

Let
$Rd$ = resistance 21 in circuit
$Ro$ = line rheostat resistance 20 in circuit
$V_L$ = line voltage
$Vt$ = testing voltage
$I$ = current through test lamp at calibration
$i$ = current through test lamp at testing time.

Assuming that the calibration voltage is 105 volts, the equation proceeds as follows:

$IRo = V_L - 105$ (at calibration)
$iRo + iRd = V_L - Vt$ (during test)

$$\therefore i(Ro + Rd) = V_L - Vt$$

$$\therefore Rd = \frac{V_L - Vt}{i} - Ro$$

$$= \frac{V_L - Vt}{i} - \frac{V_L - 105}{I}$$

$$= \frac{V_L}{i} - \frac{V_L}{I} + \left(\frac{105}{I} - \frac{Vt}{i}\right)$$

$$\therefore Rd = V_L\left(\frac{1}{i} - \frac{1}{I}\right) + \left(\frac{105}{I} - \frac{Vt}{i}\right)$$

Thus $Rd$, and hence the dial reading for a given test current and calibration (representing a given test light intensity), is a function of the line voltage $V_L$, except when $i = I$, which is rarely the case.

As above mentioned, the various dial readings indicating various respective values of resistance 21 represent, generally speaking, only a small error in the absolute light intensity of the test light 19 and do not at all detract from the usefulness of the apparatus as a clinical diagnostic instrument. If substantially complete accuracy is desired, it may be obtained by the insertion in the circuit of an automatic voltage regulator which will maintain the voltage constant at $L_1$—$L_2$ despite variations in resistance load introduced by movement of the dial pointer 22. This is an expensive expedient and special adaptations are required depending on whether the current is D. C. or A. C.

The present invention, as illustrated in the drawing, is readily applicable to any type of current, either D. C. or A. C., and is extremely simple to manufacture and install. It comprises the introduction, as a resistance balancing unit, by way of conductor 28a, of suitable resistance, such as another lamp 28 having resistance characteristics similar to that of test lamp 19, into the test light circuit, in such a manner that the resistance load on rheostat 20 is the same, regardless of the position of the arm 22 of resistance 21.

It is readily seen that test lamp 19 and balancing lamp 28 are connected in shunt with each other, but each in series with its particular portion of the resistance of the intermediately spaced dial resistance 21, which now forms and is used as a voltage divider. One of the lead wires, $L_2$, is connected with the sliding contact arm 22 of the voltage divider 21 through conductor 29, line rheostat 20, and conductors 30, 17 and 31. The other lead wire, $L_1$, completes the circuit to the lamps and voltage divider 21 by means of conductor 25 and switch 50. The voltmeter 18 is shunted across the said lamps and resistance at the points 32 and 33.

It is apparent, from a consideration of the complete circuit shown, that this arrangement permits a constant load on rheostat 20, said load being indicated by the voltage drop between points 32 and 33. In operation the line voltage is first brought to a predetermined value by means of rheostat 20. Thereafter, any variation in the position of contact arm 22 introduces no variation in the resistance load on rheostat 20 since any increase in resistance of the test lamp 19 introduced by counterclockwise movement of contact arm 22 is counteracted by a decrease in resistance of balancing lamp 28 as a result of the same movement. This of course is true only when both lamps are of similar resistance characteristics. The device may therefore be operated with assurance that the light intensity derived from test lamp 19, for any particular setting of voltage divider 21, will correspond exactly to that obtained, with the same voltage divider setting, in previous calibration, regardless of variations in the setting of rheostat 20 necessary, to correct for fluctuations in line voltage.

A dial light 49, properly shielded from the eyes of the patient, may be used for the convenience of the operator, and also a main switch 50 for use, for instance, when the instrument is temporarily shut down.

Although the invention has been here illustrated and described as applied to a Bio-Photometer such as shown in United States Patent No. 2,234,240, it is quite obvious that the inventive principle now disclosed may be utilized to advantage in electrical circuits of other devices where it is desired to maintain a constant resistance load without resort to more expensive expedients such as have heretofore been available. It is also obvious that a resistor unit may be substituted for balancing lamp 28 provided its resistance characteristics are similar to those of test lamp 19.

What I claim is:

1. Apparatus of the character set forth, comprising an electrical power supply source subject to line voltage fluctuations, a circuit connected to said source, a test lamp in said circuit energized from said source, an adjustable voltage regulating rheostat in said circuit serially connected to said test lamp whereby at any existing line voltage a preselected definite calibration voltage may be applied to the test lamp, a movable contact adjustable resistance also in said circuit with the resistance thereof at one end operatively connected to said test lamp for varying its light intensity by resistance adjustment, and a compensating balancing unit having resistance characteristics substantially identical with those of the test lamp connected in parallel with said lamp and to the other end of the adjustable resistance, so that the lamp and unit are each in series with its particular portion of the adjustable resistance and adjustment in one direction of the contact of the adjustable resistance simultaneously increases current flow through the balancing unit and equally decreases current flow through the lamp.

2. Apparatus of the character set forth, comprising an electrical power supply source subject to line voltage fluctuations, a circuit connected to said source, a test lamp in said circuit energized from said source, an adjustable voltage regulating rheostat in said circuit serially connected to said test lamp whereby at any existing line voltage a preselected definite calibration voltage may be applied to the test lamp, a movable contact adjustable resistance also in said circuit with the resistance thereof at one end operatively connected to said test lamp for varying its light intensity by resistance adjustment, and a compensating balancing lamp having resistance characteristics substantially identical with those of the test lamp connected in parallel with said test lamp and to the other end of the adjustable resistance, so that the two lamps are each in series with its particular portion of the adjustable resistance and adjustment in either direction of the contact of the adjustable resistance simultaneously increases current flow through one lamp and equally decreases current flow through the other lamp.

WILLIAM O. FROHRING.

CERTIFICATE OF CORRECTION.

Patent No. 2,352,621.                                                    July 4, 1944.

WILLIAM O. FROHRING.

It is hereby certified that error appears in the printed specification of the above numbered patent requiring correction as follows: Page 2, first column, lines 43 and 44, strike out the words "such as the lead wires" and insert the same before "$L_1-L_2$" in line 42; line 44, for "to the" read --to its--; and that the said Letters Patent should be read with this correction therein that the same may conform to the record of the case in the Patent Office.

Signed and sealed this 14th day of November, A. D. 1944.

(Seal)                                               Leslie Frazer
                                                Acting Commissioner of Patents.